(12) United States Patent
Franzén et al.

(10) Patent No.: US 11,146,097 B2
(45) Date of Patent: Oct. 12, 2021

(54) CAPACITOR MODULE

(71) Applicant: Ningbo Geely Automobile Research & Development Co., Ltd., Ningbo (CN)

(72) Inventors: Linus Franzén, Gothenburg (SE); Roger Moen, Gothenburg (SE); Heza Mahmoud, Västra Frölunda (SE); Alexander Engström, Gothenburg (SE)

(73) Assignee: NINGBO GEELY AUTOMOBILE RESEARCH & DEVELOPMENT CO.

( * ) Notice: Subject to any disclaimer, the term of this patent is extended or adjusted under 35 U.S.C. 154(b) by 109 days.

(21) Appl. No.: 16/724,246

(22) Filed: Dec. 21, 2019

(65) Prior Publication Data

US 2020/0127487 A1    Apr. 23, 2020

Related U.S. Application Data

(63) Continuation of application No. PCT/CN2018/092683, filed on Jun. 25, 2018.

(30) Foreign Application Priority Data

Jul. 3, 2017    (EP) .................................... 17179297

(51) Int. Cl.
*H02J 7/34*    (2006.01)
*B60L 50/40*    (2019.01)
(Continued)

(52) U.S. Cl.
CPC .............. *H02J 7/345* (2013.01); *B60L 50/40* (2019.02); *F02N 11/087* (2013.01);
(Continued)

(58) Field of Classification Search
CPC ........................................................ H02J 7/345
(Continued)

(56) References Cited

U.S. PATENT DOCUMENTS

2009/0322101 A1* 12/2009 Reynolds .............. F02N 11/087
290/38 R
2013/0264869 A1* 10/2013 Klinkig ................. F02N 11/087
307/10.6
(Continued)

FOREIGN PATENT DOCUMENTS

CN         205544528 U    8/2016
CN         106058998 A    10/2016
(Continued)

OTHER PUBLICATIONS

International Search Report and Written Opinion from corresponding International Patent Application No. PCT/CN2018/092683, dated Sep. 27, 2018, 8 pages.
(Continued)

*Primary Examiner* — Jerry D Robbins
(74) *Attorney, Agent, or Firm* — Tucker Ellis LLP

(57) ABSTRACT

A capacitor module for a vehicle, wherein the module includes a capacitor having a plurality of capacitor cells operatively connected to each other, a first port for being connected to a power supply arrangement, a second port for being connected to an electric machine for cranking an
(Continued)

internal combustion engine, and a third port for being connected to ground. The capacitor module includes a first electrical device connected between the first port and the capacitor and that the first electrical device is adapted for allowing a current to flow out from the capacitor module via the first port for providing power to at least one load during operation in case of a sudden voltage drop in the power supply from the power supply arrangement.

14 Claims, 2 Drawing Sheets

(51) Int. Cl.
    *F02N 11/08* (2006.01)
    *H02J 7/14* (2006.01)
(52) U.S. Cl.
    CPC ........ *F02N 11/0866* (2013.01); *H02J 7/1438* (2013.01); *F02N 2011/0885* (2013.01); *F02N 2011/0888* (2013.01)
(58) Field of Classification Search
    USPC ........................................................ 320/166
    See application file for complete search history.

(56) References Cited

U.S. PATENT DOCUMENTS

| | | | |
|---|---|---|---|
| 2014/0091854 A1* | 4/2014 | Murata | H03K 17/689 |
| | | | 327/436 |
| 2016/0082946 A1* | 3/2016 | Kodawara | B60L 50/16 |
| | | | 701/22 |
| 2016/0107635 A1* | 4/2016 | Kodawara | B60W 20/00 |
| | | | 701/22 |

FOREIGN PATENT DOCUMENTS

| | | |
|---|---|---|
| CN | 106329692 A | 11/2017 |
| DE | 102004038527 A1 | 3/2006 |
| EP | 2400649 A1 | 12/2011 |
| EP | 2562910 A1 | 2/2013 |

OTHER PUBLICATIONS

Extended European Search Report and Written Opinion from corresponding European Patent Application No. 17179297.1, dated Jan. 4, 2018, 7 pages.

International Preliminary Report on Patentability from corresponding International Patent Application No. PCT/CN2018/092683, dated Sep. 27, 2019, 13 pages.

* cited by examiner

CAPACITOR MODULE

RELATED APPLICATION DATA

This application is a continuation of International Patent Application No. PCT/CN2018/092683, filed on Jun. 25, 2018, which claims the benefit of European Patent Application No. 17179297.1, filed on Jul. 3, 2017, the disclosures of which are incorporated herein by reference in their entireties.

TECHNICAL FIELD

The invention relates to a capacitor module for a vehicle and more specifically to a system where the capacitor module is arranged for connection to an electric machine for cranking an internal combustion engine.

BACKGROUND

Vehicles having an internal combustion engine have a starter. The starter comprises an electric machine which is adapted to turn a crankshaft of the internal combustion engine for starting. The electrical energy required for driving the electric machine of the starter is drawn from an electrical energy storage. The electrical energy storage may be a battery.

The starting power or starting energy required for starting the internal combustion engine depends on a temperature of the internal combustion engine. At low temperatures, the required starting energy is greater than at higher temperatures due to a higher static friction and greater oil viscosity. Additionally, a maximally drawable discharging current decreases, particularly in a battery that is not fully charged or that has already aged. As a result, the starting reliability of conventional vehicles diminishes at low temperatures.

In order to increase the starting reliability, it is known to use an electrical energy storage in the form of a capacitor operationally connected to the electric machine. The capacitor is charged prior to starting the internal combustion engine. A capacitor has a lower internal resistance than a battery and is therefore able to provide large discharge currents during the starting operation nearly irrespective of temperature. Further, a capacitor has the advantage that they can be rapidly recharged.

Further, the vehicle has a plurality of loads, in the form of auxiliary devices (which may be engine electrics and light devices, such as lamps, audio systems, heaters, air conditioners etc.). The auxiliary devices may also be supplied with power from the electrical energy storage. Further, an electrical system is also known comprising both a capacitor and a battery for providing power to the consumers. During operation, there may be conflicting power requirements from the consumers and there may for example be transients, which in certain operational conditions may lead to insufficient power to certain consumers.

SUMMARY OF THE INVENTION

An objective of the invention is to provide a capacitor module, which creates conditions for an improved performance of an electrical system in a vehicle. The objective is achieved by a capacitor module for a vehicle, wherein the module comprises a capacitor comprising a plurality of capacitor cells operatively connected to each other, a first port for being connected to a power supply arrangement, a second port for being connected to an electric machine for cranking an internal combustion engine, a third port for being connected to ground, characterized in that the capacitor module comprises a first electrical device connected between the first port and the capacitor and that the first electrical device is adapted for allowing a current to flow out from the capacitor module via the first port for providing power to at least one load during operation in case of a sudden voltage drop in the power supply from the power supply arrangement.

The capacitor may be referred to as an ultra-capacitor or super capacitor.

Thus, if a current transient occurs in an electrical system, leading to a sudden voltage drop, the capacitor is arranged to provide a relatively high current and keep the voltage stable. In this way, certain undesired effects, such as jerks and operational interruptions, for the driver may be avoided. More specifically, the capacitor module may be adapted to provide high power with short duration towards the first port.

More specifically, the capacitor module creates conditions for securely operating the electric machine (starter motor) at any speeds without risking that the system voltage is negatively affected. Further, the capacitor module creates conditions for simultaneously supporting the system with current when there is a sudden voltage drop in the system voltage.

In modern vehicles, there are loads/consumers, such as power steering and/or brake boost, which in certain operational conditions may require substantial amounts of power, which may exceed the power available via the power supply arrangement, wherein there is a need to provide this additional power. A 12 V battery may be arranged for providing power in such operational conditions, but there may be circumstances where the battery cannot provide the required power, such as if the battery has a low state of charge or for any other reason is not working properly.

The capacitor module mentioned above, which is adapted for a dedicated operation of the electric machine (starter motor) via the second port, is further adapted for allowing a current to flow out from the capacitor module via the first port for providing power to the at least one load during operation in case of a sudden voltage drop in the power supply from the power supply arrangement. Thus, the capacitor module may be adapted for automatically providing power to the load (auxiliary device) in case of a sudden voltage drop (transients) in the power supply from the voltage supply (DC/DC) to the load.

According to one example, the first port is operatively connected to the capacitor, the second port is operatively connected to the capacitor and the third port is operatively connected to the capacitor.

According to one embodiment, the first electrical device is arranged for providing a low resistance against the current in one direction and a high resistance in the other direction. More specifically, the first electrical device is ideally arranged for providing an infinite resistance against the current in the other direction. The first electrical device may be arranged so that it provides the low resistance against the current in direction towards the first port.

According to a further embodiment, the first electrical device forms a switch, which is adapted to be automatically controlled based on a parameter indicative of voltage or current.

According to a further development of the last-mentioned embodiment, the first electrical device is adapted to be automatically controlled based on a relationship between a system voltage and a voltage over the supercapacitor.

According to a further development of the last-mentioned embodiment, the first electrical device is adapted to be automatically switched on when the system voltage is lower than the voltage over the supercapacitor and automatically switched off when the voltage over the supercapacitor is lower than the system voltage.

According to an alternative to the further development, the first electrical device is adapted to be automatically switched off if an inrush current to the capacitor exceeds a certain pre-defined threshold value but allow any discharge current from the capacitor to the electrical system.

According to a further development of the last-mentioned embodiment, the first electrical device comprises a diode. Due to the structure and functioning of diode, it forms a suitable electrical component for providing a low (ideally zero) resistance against the current in one direction and a high (ideally infinite) resistance in the other direction. A diode may be defined as a two-terminal electronic component that conducts primarily in one direction (asymmetric conductance).

According to a further development of the last-mentioned embodiment, the first electrical device comprises a metal-oxide-semiconductor field-effect transistor (MOSFET). Due to the structure and functioning of MOSFET, it forms a suitable electrical component for providing a low (ideally zero) resistance against the current in one direction and a high (infinite) resistance in the other direction.

According to a further embodiment, the capacitor module comprises a second electrical device connected between the first input and the capacitor and that the second electrical device is adapted for opening and closing, respectively, an electrical connection between the first port and the capacitor in response to a control signal. More specifically, the second electrical device forms a switch.

According to a further development of the last-mentioned embodiment, the second electrical device is connected between the first electrical device and the capacitor.

According to a further development of the last-mentioned embodiment, the second electrical device comprises two metal-oxide-semiconductor field-effect transistors (MOSFETs) arranged in a back-to-back relationship. Due to the structure and functioning of two MOSFETs arranged in a back-to-back relationship, such an arrangement forms a suitable electrical component for providing a switch function.

According to a further embodiment, the capacitor module comprises a third electrical device connected between the first input and the capacitor and that the third electrical device is adapted for limiting a current flowing into the first port to a predetermined level.

According to a further aspect of the invention, a further objective is to provide an electrical system for a vehicle, which creates conditions for an improved performance.

The objective is achieved by an electrical system for a vehicle, wherein the system comprises a power supply arrangement, at least one load operatively connected to the power supply arrangement, an electric machine adapted for cranking an internal combustion engine, and a capacitor module according to any one of the embodiments above, wherein the capacitor module is operatively connected to the power supply arrangement via the first port for providing power to the at least one load during operation in case of a sudden voltage drop in the power supply from the power supply arrangement and wherein the capacitor module is operatively connected to the electric machine via the second port.

According to one embodiment, the system comprises a low-voltage electrical energy storage operatively connected to the at least one load for providing power to the at least one load. The low-voltage electrical energy storage may be formed by a battery, such as a lead-acid 12 V battery. The capacitor module may be arranged to provide a redundancy to the 12 V battery.

According to a further aspect of the invention, it regards a vehicle comprising an electrical system as defined above.

According to a further aspect of the invention, a further objective is to provide a method for operating an electrical system for a vehicle, which creates conditions for an improved performance.

The objective is achieved by the step of maintaining a connection between the capacitor and the first port during operation so that a current can flow out from the capacitor module via the first port and provide power to the at least one load during operation in case of a sudden voltage drop in the power supply from the power supply arrangement.

According to one embodiment, the method comprises the step of establishing a connection between the capacitor and the first port when the vehicle is started. For example, a control unit may be adapted to close a switch in the capacitor module when the vehicle is started so that the connection is established, wherein the capacitor may be charged the same voltage level as the board net.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EMBODIMENTS

Figure 1:
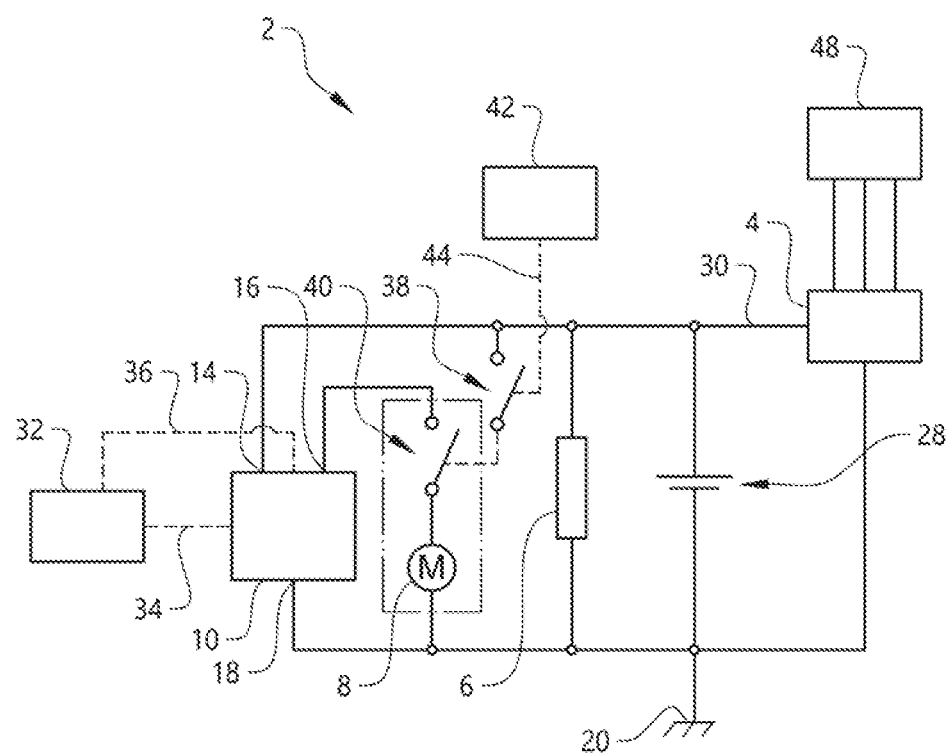
FIG. 1 is a schematic view of an electrical system according to an example embodiment of the invention.

FIG. 1 is a schematic view of an electrical system 2 comprising a power supply arrangement 4 in the form of a DC/DC Converter.

The electrical system 2 further comprises at least one load 6 operatively connected to the power supply arrangement 4. The loads may be formed by auxiliary devices, such as electrical circuits for engine control, braking and steering. Further, the loads may be formed by light devices, such as lamps, audio systems, heaters, air conditioners, compressors etc.

Figure 2:
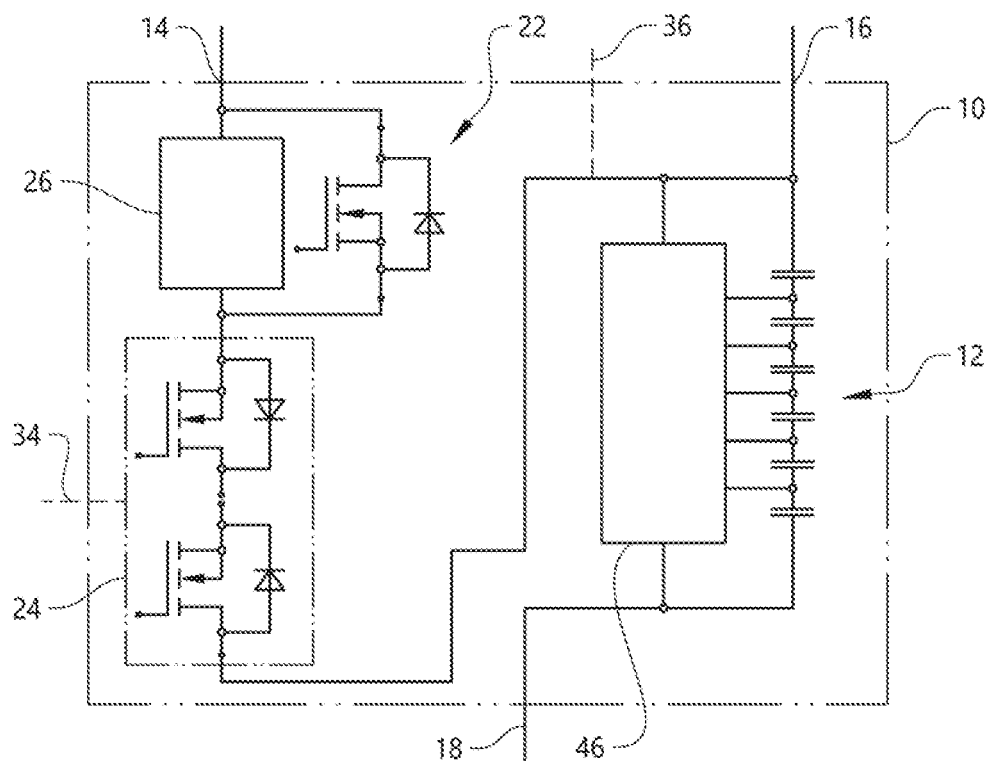
FIG. 2 is a schematic view of a capacitor module according to an example embodiment of the invention forming part of the electrical system in FIG. 1.
Figure 3:
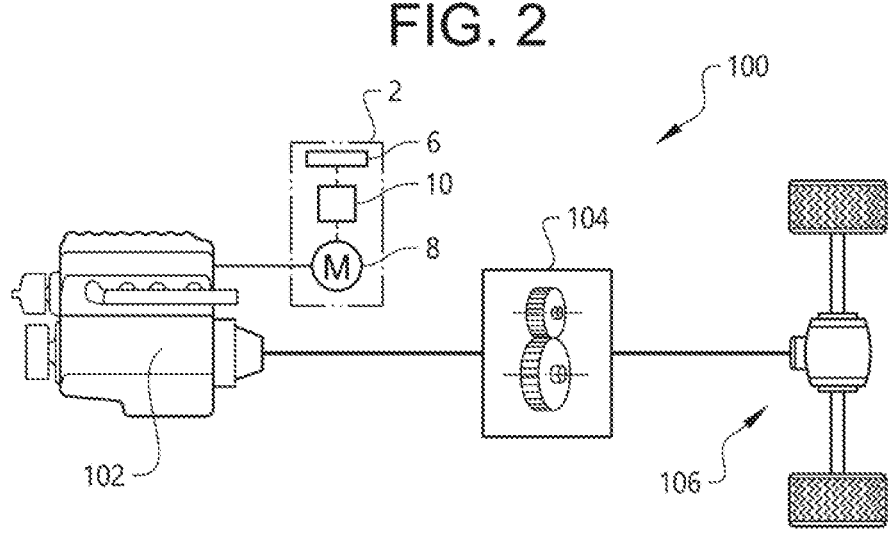
FIG. 3 is schematic view of a vehicle according to an example embodiment of the invention comprising the electrical system in FIG. 1.

The electrical system 2 further comprises an electric machine 8 adapted for cranking an internal combustion engine 102, see FIG. 3. The electric machine 8 may be formed by a starter motor, which has a gear meshing with an engine starting gear (ring gear) rotationally rigidly connected to a crankshaft of the engine. The electric machine 8 is powered by a capacitor 12, see also FIG. 2, to be described below and forms a cranking motor for driving or rotating the crankshaft when the engine is started. According to an alternative, the starter is formed by the same unit as a generator coupled to a crankshaft of the engine as a single integrated starter-generator.

The electrical system 2 further comprises a capacitor module 10, which is shown in more detail in FIG. 2. The capacitor module 10 comprises the capacitor 12, which comprises a plurality of capacitor cells operatively connected to each other.

The capacitor 12 is an electrical energy storage device that is mounted as a dedicated power supply of the starter motor. The capacitor 12 may be formed by an electric double layer capacitor (eDLC: electric Double Layer Capacitor), which has a large capacitance and excellent characteristics in quick charging and discharging performance. For example, the capacitor may be formed by connecting six double layer capacitors having a rated voltage of 2.5 V. According to an alternative, the number of capacitor cells may be fewer or more than six and the rated voltage of each cell may differ from 2.5 V. Therefore, the capacitor can be charged to 15 V (=2.5 V*6). The capacitor 12 may be formed by connecting a plurality of cells in series and/or parallel.

The capacitor module 10 further comprises a first port 14 for being connected to the power supply arrangement 4, a second port 16 for being connected to the electric machine 8 for cranking the internal combustion engine and a third port 18 for being connected to ground 20. The ground 20 may be formed by a chassis ground in the vehicle.

Further, the capacitor module 10 comprises a first electrical device 22 connected between the first port 14 and the capacitor 12. The first electrical device 22 is adapted for allowing a current to flow out from the capacitor module 10 via the first port 14 for providing power to the at least one load 6 during operation in case of a sudden voltage drop in the power supply from the power supply arrangement 4. The first electrical device 22 is arranged for providing a low (ideally zero) resistance against the current in one direction and a high (ideally infinite) resistance in the other direction. According to one example, the first electrical device comprises a diode. According to one example, the first electrical device comprises a metal-oxide-semiconductor field-effect transistor (MOSFET). Thus, in other words, the first electrical device forms a power MOSFET.

More specifically, the first electrical device 22 forms a switch, which is adapted to be automatically controlled based on a relationship between the system voltage and the voltage over the supercapacitor 12. More specifically, the first electrical device 22 is automatically switched on when the system voltage (via port 14) is lower than the voltage over the supercapacitor 12. Further, the first electrical device 22 is automatically switched off when the voltage over the supercapacitor 12 is lower than the system voltage.

Instead of measuring and comparing the voltages on the electrical system and the supercapacitor 12, the automatic disconnection feature could also be triggered on current measurements. For instance; disconnect the supercapacitor 12 from the electrical system if the inrush current exceeds a certain pre-defined threshold value but allow any discharge current from the supercapacitor 12 to the electrical system. This can be accomplished by using conventional shunts together with voltage comparators.

The capacitor module 10 is operatively connected to the power supply arrangement 4 via the first port 14 for providing power to the at least one load 6 during operation in case of a sudden voltage drop in the power supply from the power supply arrangement 4 and wherein the capacitor module is operatively connected to the electric machine 8 via the second port 16.

Further, the capacitor module 10 comprises a second electrical device 24 connected between the first input 14 and the capacitor 12. The second electrical device 24 is adapted for opening and closing, respectively, an electrical connection between the first port 14 and the capacitor 12 in response to a control signal. Thus, the second electrical device 24 forms a switch. The switch 24 is controlled via a control signal from a control unit 32, see dotted line 34. The second electrical device 24 is connected between the first electrical device 22 and the capacitor 12. According to one example, the second electrical device 24 comprises two metal-oxide-semiconductor field-effect transistor (MOSFET) arranged in a back-to-back relationship.

Further, the control unit 32 is also adapted to perform an analogue voltage measurement directly on the capacitor 12 for diagnostic purposes, see dotted line 36. The ground connection is through a ground of the control unit 32.

Further, the capacitor module 10 comprises a third electrical device 26 connected between the first input 14 and the capacitor 12. The third electrical device 26 is adapted for limiting a current flowing into the first port to a predetermined level. In other words, the third electrical device 26 forms a charge current limitation circuit. For example, the third electrical device 26 may comprise a DC/DC Buck Converter (not shown) for limiting a current flowing into the first port to a predetermined level. The first electrical device 22 is arranged in parallel with the charge current limitation circuit 26. According to an alternative, the first electrical device 22 may form a part of the charge current limitation circuit 26.

Further, the capacitor module 10 comprises a cell balancing unit 46 operatively connected to the capacitor 12. The cell balancing unit 46 is adapted to make sure that the capacitor cells keep the same voltage level to prevent premature ageing of single cells.

The electrical system 2 further comprises a low-voltage electrical energy storage 28, in the form of a battery, operatively connected to the at least one load 6 for providing power to the at least one load. The battery 28 may be a rechargeable 12 V battery arranged for powering the other auxiliary equipment except the starter motor 8. For example, a lead-acid battery is used. In other words, according to the power supply system, as shown in FIG. 1, the 12 V battery forms a 12 V system load power, and the capacitor forms a starter power supply, respectively. The capacitor module 10 and the 12 V battery 28 are connected via DC branch harness 30 to the DC/DC Converter 4. The DC/DC Converter 4 is adapted to convert the several hundred volts voltage from a high voltage circuit to 12 V.

The electrical system 2 further comprises a starter relay 38, which is connected to a starter motor solenoid 40. An engine control unit 42 is adapted to control the starter relay, see dotted line 44.

The DC/DC Converter 4 is adapted for two main functions: To convert 400 V DC from an associated high voltage system 48 to 12 V DC and to invert the generated AC voltage from an electric machine (not shown) in the high voltage system 48 to 400 V DC. When the vehicle is in an electric mode, a 400 V high-voltage electrical energy storage, such as a Li-ion battery pack, (not shown) provides power to the DC/DC Converter 4 to supply the 12 V loads and at the same time provides power to the electric machine driving the vehicle forward. When the engine is on, the electric machine is generating power to both the 400 V battery and the DC/DC Converter 4.

Turning now to an example operation of the electrical system 2.

When the switch 24 is closed during driving, current can flow in either direction through the first port 14. The current flowing into the first port 14 will be limited to 50 A by the DC/DC Buck Converter 26. The current flowing out of the first port 14 is not actively limited and will function as a board net voltage stabilization.

If a current transient occurs, (e.g. from power steering and/or brake boost) and the DC/DC Converter 4 (or alternator in a conventional vehicle) is not able to keep the voltage steady, the capacitor 12 has the capacity to provide >300 A to the board net and keep the voltage stable as a redundancy to the 12 V Lead Acid Battery 28.

When the vehicle is started the control unit 32 will close the switch 24 and the capacitor 12 will be charged the same voltage level as the board net. When a predetermined voltage level has been achieved, the charging stops automatically.

If the voltage on the capacitor 12 is above a specific threshold value, a 12 V start will be allowed. During a 12 V start the engine control unit 42 will close the starter relay 38, which in turn closes the starter motor solenoid 40. The current to the starter motor 8 will be provided solely by the capacitor 12 through the second port 16 leaving no chance of voltage destabilization of the board net. As the voltage drops on the capacitor 12, the charging will automatically start drawing a maximum of 50 A from the board net.

If a failure occurs which causes the capacitor 12 to draw more than 50 A from the board net, an internal fuse (not shown) will blow disabling any further use of the capacitor 12 and the starter motor 8 until it is replaced in a workshop.

The switch 24 will be closed at all times when the vehicle is in drive mode or if an external charger (not shown) is connected to the vehicle. When the vehicle is stationary (and no charger connected), the switch will be open.

Each one of the control units 32, 42 may comprise one or more microprocessors and/or one or more memory devices or any other components for executing computer programs to control the electrical system and perform the method. Thus, the control unit is preferably provided with a computer program for operating the system and performing the steps of the method described hereinabove. Furthermore, the control unit can be part of a controller used also for other functions of the electrical system and/or any other function of a vehicle or be provided as a separate unit.

FIG. 3 is schematic view of a vehicle 100 according to an example embodiment of the invention comprising the electrical system 2 in FIG. 1. The vehicle comprises the internal combustion engine 102. The electric machine 8 is adapted for cranking the internal combustion engine 102. Further, a crankshaft of the engine 102 is drivingly connected to a transmission 104 and an output shaft of the transmission is drivingly connected to left and right wheels via a differential gear 106.

It is to be understood that the present invention is not limited to the embodiments described above and illustrated in the drawings; rather, the skilled person will recognize that many changes and modifications may be made within the scope of the appended claims.

Thus, the system described above is related to vehicles having an internal combustion engine. The internal combustion engine may be adapted for supplying motive power for providing tractive effort via a mechanical drivetrain. The system may further be applied in hybrid vehicles, which is a vehicle that has two or more sources of power, for example an internal combustion engine and a source of electric power. Further, the internal combustion engine may be dedicated for charging a source of electric power.

The vehicle is above described in the context of a passenger car, but may alternatively be a truck, bus, watercraft boat, ship or aircraft.

What is claimed is:

1. A capacitor module for a vehicle, wherein the module comprises:
    a capacitor comprising a plurality of capacitor cells operatively connected to each other,
    a first port for being connected to a power supply arrangement,
    a second port for being connected to an electric machine for cranking an internal combustion engine, and
    a third port for being connected to ground, and
    wherein the capacitor module comprises a first electrical device connected between the first port and the capacitor and wherein the first electrical device is adapted for allowing a current to flow out from the capacitor module via the first port for providing power to at least one load during operation in case of a sudden voltage drop in the power supply from the power supply arrangement,
    wherein the first electrical device is arranged for providing a low resistance against the current in one direction and a high resistance in the other direction,
    wherein the first electrical device forms a switch, which is adapted to be automatically controlled based on a parameter indicative of voltage or current, and
    wherein the first electrical device is adapted to be automatically switched off if an inrush current to the capacitor exceeds a certain pre-defined threshold value but allow any discharge current from the capacitor to the electrical system.

2. A capacitor module for a vehicle according to claim 1, wherein the first electrical device is adapted to be automatically controlled based on a relationship between a system voltage and a voltage over the supercapacitor.

3. A capacitor module for a vehicle according to claim 2, wherein the first electrical device is adapted to be automatically switched on when the system voltage is lower than the voltage over the supercapacitor and automatically switched off when the voltage over the supercapacitor is lower than the system voltage.

4. A capacitor module for a vehicle according to claim 1, wherein the first electrical device comprises a diode.

5. A capacitor module for a vehicle according to claim 1, wherein the first electrical device comprises a metal-oxide-semiconductor field-effect transistor.

6. A capacitor module for a vehicle according to claim 1, wherein the capacitor module comprises a second electrical device connected between the first port and the capacitor and wherein the second electrical device is adapted for opening and closing, respectively, an electrical connection between the first port and the capacitor in response to a control signal.

7. A capacitor module for a vehicle according to claim 6, wherein the second electrical device is connected between the first electrical device and the capacitor.

8. A capacitor module for a vehicle according to claim 6, wherein the second electrical device comprises two metal-oxide-semiconductor field-effect transistors arranged in a back-to-back relationship.

9. A capacitor module for a vehicle according to claim 1, wherein the capacitor module comprises a third electrical device connected between the first port and the capacitor and the third electrical device is adapted for limiting a current flowing into the first port to a predetermined level.

10. An electrical system for a vehicle, wherein the system comprises
    a power supply arrangement,
    at least one load operatively connected to the power supply arrangement,
    an electric machine adapted for cranking an internal combustion engine, and
    a capacitor module according to claim 1, wherein the capacitor module is operatively connected to the power supply arrangement via the first port for providing power to the at least one load during operation in case of a sudden voltage drop in the power supply from the power supply arrangement and wherein the capacitor module is operatively connected to the electric machine via the second port.

11. An electrical system according to claim 10, wherein the system comprises a low-voltage electrical energy storage operatively connected to the at least one load for providing power to the at least one load.

12. A vehicle comprising an electrical system according to claim 10.

13. A method for operating the electrical system according to claim 10, wherein the method comprises the step of maintaining a connection between the capacitor and the first port during operation so that a current can flow out from the capacitor module via the first port and provide power to the at least one load during operation in case of a sudden voltage drop in the power supply from the power supply arrangement.

14. A method according to claim 13, wherein the method comprises the step of establishing a connection between the capacitor and the first port when the vehicle is started.

* * * * *